United States Patent Office 2,994,544
Patented Aug. 1, 1961

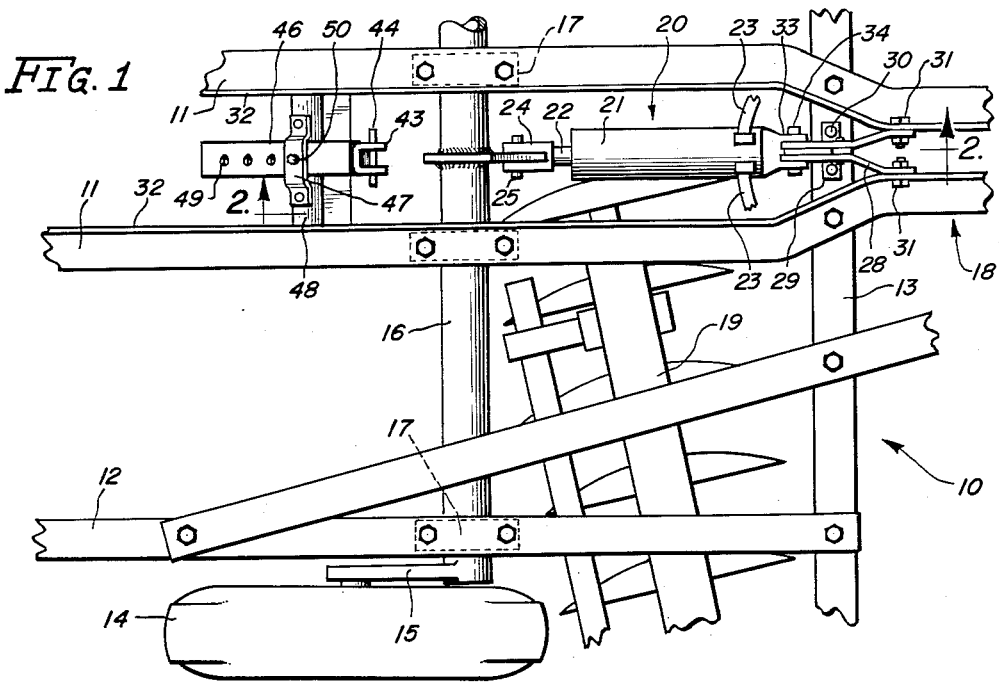
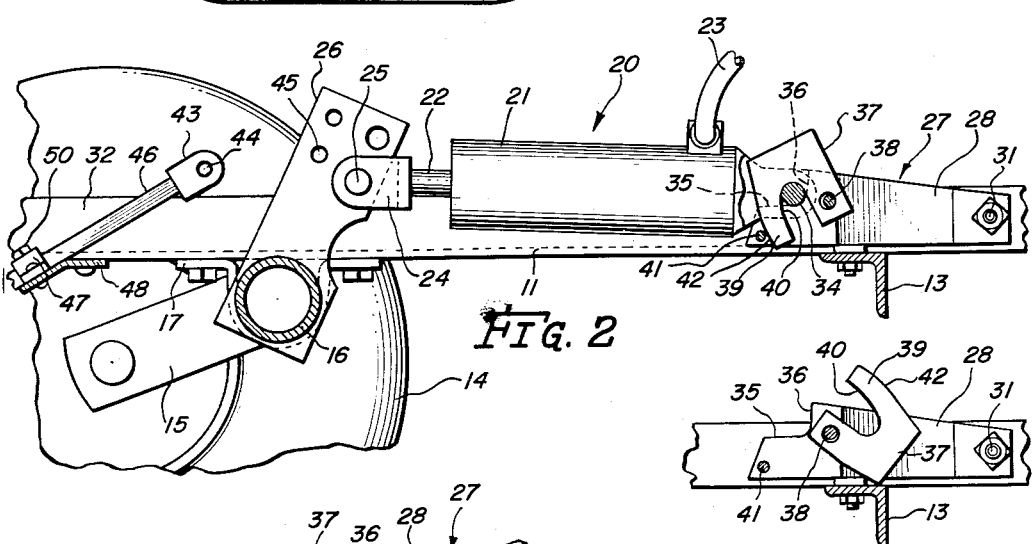
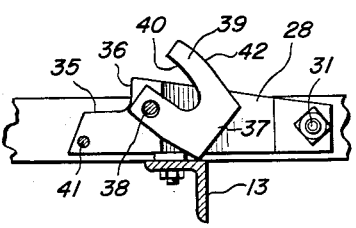
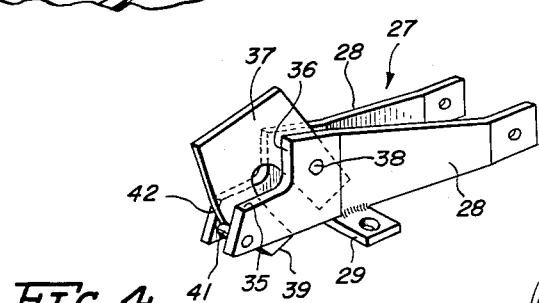
Aug. 1, 1961 — F. C. WOLF — 2,994,544
HYDRAULIC RAM MOUNTING
Filed Dec. 21, 1959
INVENTOR
Fred C. Wolf
Paul O. Pippel
ATTORNEY

2,994,544
HYDRAULIC RAM MOUNTING
Fred C. Wolf, Sterling, Ill., assignor to International Harvester Company, Chicago, Ill., a corporation of New Jersey
Filed Dec. 21, 1959, Ser. No. 860,849
5 Claims. (Cl. 280—43.23)

This invention relates to hydraulic ram attachments and particularly to ram attachments for tractor propelled implements adapted to be moved between operating and transport positions, or having other operating parts to be moved by power.

In farming operations and the like, it is customary for a tractor operator to utilize a single hydraulic cylinder and piston unit for a number of implements which he may attach to a particular tractor. When the ram is taken from one implement and mounted upon another, or returned to the original implement, the connecting points at the end of the piston and of the cylinder do not coincide with the connecting elements upon the implement. This has previously required the trial and error method of extending and retracting the piston in the ram cylinder to find the right spacing between the connecting elements on the implement. Therefore, an object of the present invention is the provision of simple and efficient mounting means facilitating the attachment of a hydraulic ram unit to an implement.

Another object of the invention is the provision of novel means for mounting a hydraulic ram unit upon an implement of the type having a part to be moved from one position to another and held there, wherein considerable tolerance in the length of the ram unit is accommodated by the mounting means therefor.

Another object of the invention is the provision of an improved hydraulic ram mounting for an implement including a guide and support for the connecting pin at one end of the ram having an abutment engageable by the pin upon extension of the ram and a latch member pivoted on the implement frame, wherein the latch member is freely pivotable to and from a position to confine said pin and is frictionally engageable with another stop to prevent release of the latch when the ram is retracted.

Other objects and advantages of the invention will become clear from the following detailed description when read in conjunction with the accompanying drawings, wherein:

FIGURE 1 is a plan view of a detail showing a portion of a tandem disk harrow of the wheel supported type having incorporated therein a hydraulic ram mounting embodying the features of this invention;

FIGURE 2 is a section, on an enlarged scale, taken on the line 2—2 of FIGURE 1;

FIGURE 3 is a detail of the latch mechanism of this invention in released position, and FIGURE 4 is a view in perspective of a detail showing, removed from the implement, the guide and the support bracket for receiving the connecting pin at the end of the cylinder, and with the latch in locking position thereon.

In the drawings the numeral 10 designates the frame of a trail-behind implement in the form of a tandem disk harrow, only a portion of which is shown, including centrally disposed longitudinally extending frame bars 11, side bars 12 and transversely extending frame bars 13, only one of which, is shown. Only a portion of one-half of the disk harrow is shown, and a single supporting wheel 14 appears in the drawing, although it may be understood that transversely spaced therefrom at the opposite end of the frame is a similar wheel.

Wheel 14 is mounted on a crank arm 15 which, in turn, is affixed to a transversely extending rock shaft 16 rotatably supported in brackets 17. At their forward ends the central frame bars 11 converge and extend forwardly to form a hitch structure 18 adapted for connection at its forward end to a tractor, not shown.

The implement of this invention includes a plurality of disk gangs 19, only one of which is shown, and is vertically moved between operating and transport positions by rocking the shaft 16 to swing wheel 14 in a vertical plane, in a manner well known in the art. Rocking of the shaft 16 to raise and lower the implement is accomplished by power operated means in the form of a hydraulic ram 20 comprising a cylinder 21 and a piston rod 22 slidable therein between extended and retracted positions in response to fluid under pressure supplied to the ram through hose lines 23 from a source on the tractor, not shown.

The piston rod 22 is provided at its end with a clevis 24 mounted on a pin 25 carried by an arm 26 affixed, as by welding, to the shaft 16 centrally thereof.

Extension of rod 22 in cylinder 21 rocks the arm 26 and shaft 16 in a direction to swing crank arms 15 downwardly and lower the wheels 14 with respect to the frame 10 and thus raise the working disk gangs 19 to a transport position. Conversely, retraction of rod 22 in the cylinder rocks the arm 26 in a clockwise direction as viewed in FIGURE 2, to elevate the wheels 14 relative to the tool carrying frame, and thus lower the latter into working position.

The cylinder 21 is anchored to the frame or to a relatively stationary part of the frame 10 in the form of a bracket 27 comprising a pair of laterally spaced plates 28 having welded to the lower edges thereof a cross bar 29 secured by bolts 30 to the frame bar 13. Plates 28 diverge forwardly and their rear ends are secured by bolts 31 to upstanding flanges 32 on the central frame bars 11.

The forward end of cylinder 21 is provided with a clevis 33 carrying a connecting pin 34 adapted to rest upon and to be supported and guided by a generally horizontal ledge 35 terminating in an abutment 36 formed on the upper edge of each of the plates 28 at the rear ends thereof.

Clevis 33 straddles the rear ends of plates 28 of bracket 27, and pin 34 is locked in the position shown in FIGURE 2 against the abutment 36 by means of a latch member 37 pivotally mounted between the plates 28 upon a pin 38 carried thereby. Latch member 37 includes a hook portion 39 forming with the main body of the latch a recess 40 adapted to receive the connecting pin 34 when the latch is swung into the locking position of FIGURE 2.

Latch member 37 is made resistant to the stresses imposed thereon by contracting strokes of the hydraulic ram 20 tending to break the hook portion 39 of the latch, by the provision of a stop pin 41 extending between the forward lower ends of plates 28 and engageable with the outer edge 42 of the hook portion 39, not only to absorb stresses imposed upon the hook portion 39 but the prevent rocking of the latch, the presence of the stop pin 41 making it unnecessary to otherwise secure the latch member to the plates 28 to hold the latch in its locked position.

It will be noted from FIGURE 2 that pin 34 is somewhat over center with respect to a center line through pins 25 and 38 so that latch member 37 is not swung upwardly about the pivot 38 by the contracting stroke of the ram 20. Inasmuch as the terrain over which the implement normally operates is rough, it is likely that the latch would be thrown out of its normally locked position. Applicant has made the discovery that stop pin 41 performs the dual function of locking latch member 37 without weakening the latch by pinning it directly to the frame, and of preventing the latch from becoming accidentally dislocated during operation. Looseness in the pin connection 38 permits hook portion 39 of the latch to be pressed against stop pin 41 and prevent pivoting of the latch.

When the implement is to be raised to its transport position the piston rod 22 is extended in the cylinder to rock the arm 26 in a counterclockwise direction until it is received in a clevis 43 carrying a pin 44 to be received in one of the openings 45 in arm 26. Clevis 43 is at the end of an adjustable bar 46 slidable between a clamp 47 and a brace 48 secured to the frame members 11. Bar 46 is provided with a plurality of openings 49 to receive a bolt 50 carried by the clamp 47, and with the arm 26 held in clevis 43, the implement is retained in a raised position. The hydraulic ram 20 can then be removed from the implement by rocking latch 37 about its pivot 38 as shown in FIGURE 3 and removing pin 25. When the ram is returned to the implement as shown in FIGURE 2, and assuming a variation in the length thereof, pin 34, resting on ledge 35, moves against the abutment 36 upon extension of the piston in the cylinder. The latch can then be rocked to its locked position, pin 44 removed from opening 45 and arm 26, and the cylinder can then be actuated to rock the arm 26 in either direction.

It is believed that the novel mounting apparatus for hydraulic ram described herein will be clearly understood from the foregoing description. It should likewise be understood that the invention has been described in its preferred embodiment and modifications may be made therein without departing from the spirit of the invention or the scope of the appended claims.

What is claimed is:

1. Means for mounting a double acting hydraulic ram on an implement having a frame and a shiftable element to which one end of the ram is connected, comprising a connecting pin at the other end of the ram, a guide member on the frame having a horizontal upper edge of sufficient length to engage and slidably support the connecting pin on the ram irrespective of minor variations in the length thereof, an abutment on said guide member engageable with said pin after a predetermined extension of said ram to take the thrust thereof and to shaft said shiftable element, a latch member pivotally mounted on the frame and having a pin-engaging part, said latch member being freely pivotable, from a latched position with said pin-engaging part taking the thrust of the ram upon retraction thereof to shift said element, to an unlatched position with respect to said pin, and stop means on the frame engageable with the outer surface of said pin engaging part in the latched position of said latch member to hold it against pivoting when the ram is retracted, said stop means being the sole means preventing pivoting of the latch member to its unlatched position.

2. The invention set forth in claim 1, wherein the pin engaging part of said latch member includes a hook portion adapted to partly encircle said pin in the latched position thereof, and said stop means is a projection carried by the frame and engageable with the outer edge of said hook portion in the latched position of said latch member.

3. The invention set forth in claim 2, wherein the outer stop engaging edge of said hook portion is curved to define an arc substantially about the pivot axis of the latch member on the frame.

4. Means for mounting a double acting hydraulic ram on an implement having a frame and a shiftable element to which one end of the ram is connected, comprising a connecting pin at the other end of the ram, a guide member on the frame having a horizontal upper edge of sufficient length to engage and slidably support the connecting pin on the ram irrespective of minor variations in the length thereof, an abutment on said guide member engageable with said pin after a predetermined extension of said ram to take the thrust thereof and to shift said shiftable element, a latch member having a main body freely pivoted on the frame and a hook forming a recess therebetween and the main body to receive the connecting pin when the latter engages the abutment, and a stop pin mounted on the frame below the connecting pin and the pivot of the latch member and engageable with the outer edge of said hook upon retraction of the ram to prevent pivoting of the latch member to its unlatched position.

5. The invention set forth in claim 4, wherein said stop pin is normally spaced from the outer edge of said hook and the pivotal connection of the latch member to the frame is sufficiently loose to accommodate engagement of the hook with said stop pin upon retraction of the ram.

References Cited in the file of this patent

UNITED STATES PATENTS

| | | |
|---|---|---|
| 1,398,547 | Graham | Nov. 29, 1921 |
| 2,319,492 | Dewey | May 18, 1943 |
| 2,616,351 | Silver | Nov. 4, 1952 |
| 2,654,302 | Starr | Oct. 6, 1953 |
| 2,686,648 | Oehler | Aug. 17, 1954 |

FOREIGN PATENTS

| | | |
|---|---|---|
| 822,097 | Germany | Nov. 22, 1951 |
| 820,109 | Great Britain | Mar. 20, 1958 |